United States Patent [19]
Bourges

[11] Patent Number: 5,033,963
[45] Date of Patent: Jul. 23, 1991

[54] COLOR SYSTEM

[76] Inventor: Jean Bourges, 20 Waterside Plz., New York, N.Y. 10010-2615

[21] Appl. No.: 372,644

[22] Filed: Jun. 28, 1989

[51] Int. Cl.$^5$ .............................................. G09B 19/00
[52] U.S. Cl. ..................................................... 434/98
[58] Field of Search ................................. 434/98, 84

[56] References Cited

U.S. PATENT DOCUMENTS 1,753,619 4/1930 Norberg ................................. 434/98
3,474,546 10/1969 Wedlake ................................ 434/98

OTHER PUBLICATIONS

"Positional Color Coding—A Color Identification System That Combines Color and Intensity", Hendrickson, *Information Display*, vol. 11, No. 6 (1975) p. 22.
Giancoli, "*General Physics*", Prentice Hall, Inc. 1984 p. 696.
"Precise Color Communication", from Minolta Catalogue, Date Unknown.
Minolta Catolog "Precise Color Communication", (1989).

*Primary Examiner*—William H. Grieb
*Attorney, Agent, or Firm*—Charles E. Temko

[57] ABSTRACT

A color value classification system employing a combination of four basic colors and five hues substantially covering the visible spectrum. The specific hues and tints are not equally spaced from the standpoint of wavelength, but are positioned within the visible spectrums to facilitate the making of other hues, increasing or decreasing contrasts, other shades and similar variants. The provision of twenty basic hues and percent tints permits the reproduction of the colors in commercially usable forms including printing inks, transparent color sheets, colored papers, coating materials and paints. Using a relatively small number of color variants, the teaching of color is materially simplified, as in the establishment of simple translation of art copy into forms for convenient replication.

2 Claims, 1 Drawing Sheet

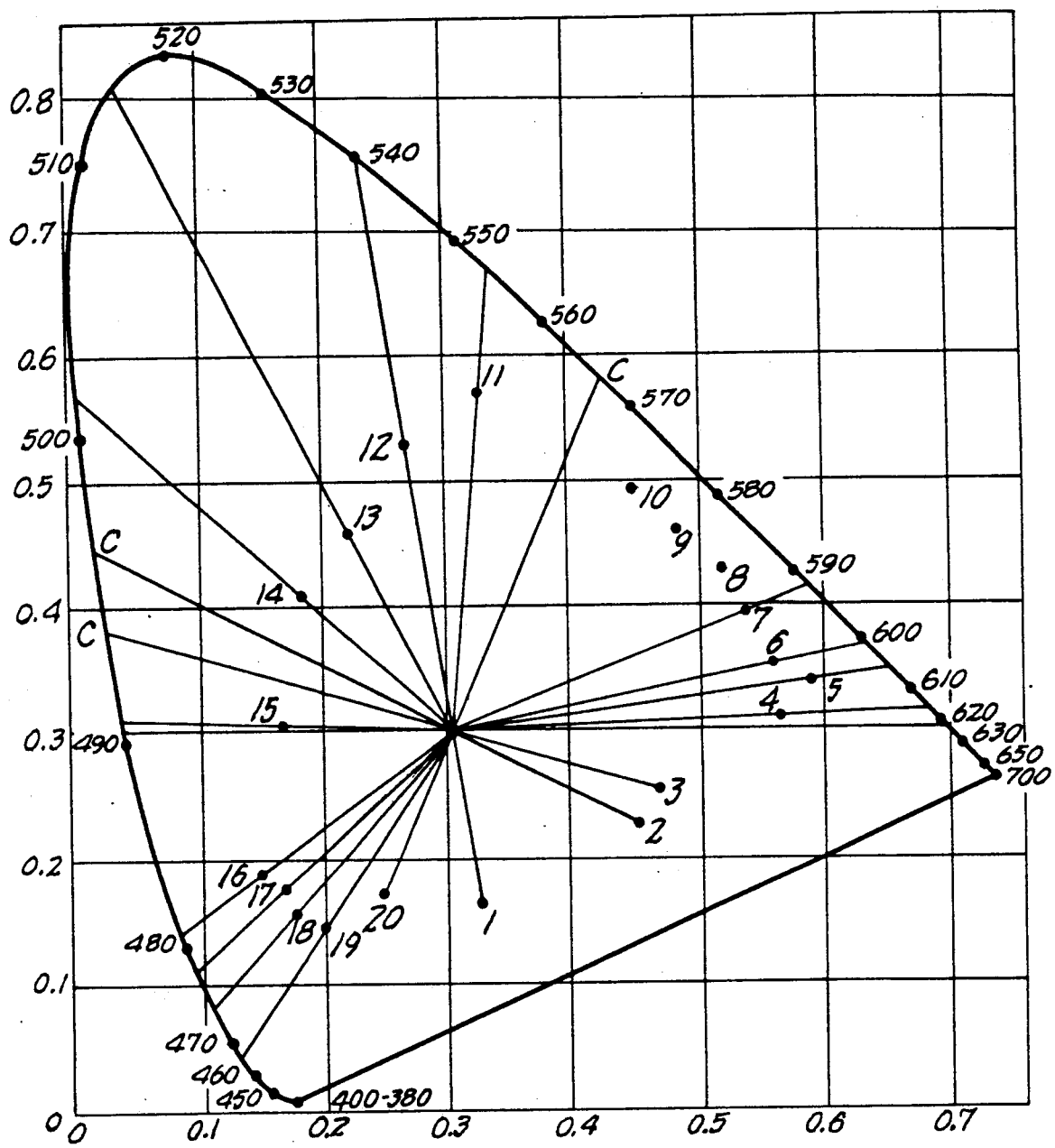

COLOR SYSTEM

BACKGROUND OF THE INVENTION

This invention relates generally to the field of standardized color systems, and more particularly to an improved technology by means of which reproduceable colors are identified and related to a standard primarily in terms of hue and tint.

The prior art systems, typically comprise a variety of representations of very large numbers of hues and tints, each having an identifying number or symbol. Such systems do, in fact, provide means for identification, but lose sight of the fact that not all of the many artist's colors are readily reproduceable in various color mediums for purpose of reproduction. While small lots of paints and similar coatings are routinely prepared, the reproduction of colors on a printed page normally requires very precise printing inks which cannot be economically produced in large quantities, in more than a relatively limited number of colors. This is equally true in the case of the manufacture of other color materials, such as pencils, color sheets, colored paper, acrylics and airbrush colors.

As a result, it is often difficult to reproduce with any reasonable degree of fidelity, the work product of an artist who has used a random assortment of colors in the creation of a work, with a corresponding loss in visual accuracy in the reproduction. Although computer technology has permitted the accurate identification of literally thousands of hues and tints comprising the visible spectrum, the reproduction of such variations is still a matter of costly color matching using relatively complex technologies. Materials have been improved in recent years to permit increased brightness, resistance to fading, and other desirable characteristics. These improved qualities do not simplify ready reproductions of a desired color. It is known to use standard color sheets for producing original art copy, but, lacking a fully comprehensive standarized color system, the use of these sheets has resulted in limitations in reproduction.

SUMMARY OF THE INVENTION

Briefly stated, the invention contemplates the provision of an improved simplified color order system in which the number of hues and tints has been limited to a manageable scope, without reducing utility, or placing significant limitations on the imagination of the artist. To this end, the system incorporates the use of four groups of colors each comprising five basic hues with standardized scales of tints for each hue. The range of tints is such that they can be combined for convenient interpolation over the desired hue by blending standardized tints. Thus, once the desired color has been determined by the artist, a simple memorandum of the mixture employed to obtain the color will enable the accurate reproduction of the color for large-scale reproduction using corresponding inks, the correct tint of which can be obtained by dot, digitalization or simple dilution. The system may employ standard CIE-Lab notation, with a separate two digit number indicating the percentage of an identified tint and the addition of another two digit number, if any black is used. To facilitate color selection by the user, the twenty hues are determined such that they may be arranged on a bilinear chart with complementary colors disposed opposite each other. The specific hues are chosen to correspond to colors that are most commonly used in the arts and graphic arts industry, thereby permitting ready reduceability.

BRIEF DESCRIPTION OF THE DRAWINGS

In the drawings, to which reference will be made in the specification:

FIG. 1 is a view of a CIE Lab color horseshoe embodying the invention.

FIG. 2 is a chart representing typical tint strengths which may be provided for each of the hues shown in FIG. 1 to afford a useful range of tints for blending purposes.

DETAILED DESCRIPTION OF THE DISCLOSED EMBODIMENT

In accordance with the invention, the disclosed system contemplates the establishment of four basic colors, each color group comprising five hues. Each hue is assigned a sequential ordinal number, commencing with the red and terminating with the blues.

With reference to FIG. 1, a first color group includes five variations of reds, ranging in nanometer values from 700 to 610. A second color group includes the yellows ranging in nanometer value from 610 to 570. A third group covers the greens and ranges from 570 to 490 nanometers. A fourth color group includes the blues ranging from 490 to 400 nanometers. The precise value of each of the hues is set forth below in terms of CIE-Lab coordinates, and reference is made to FIG. 2 in the drawing to facilitate the location of these colors on the CIE-Lab chart.

| HUE | $a^*$ | $b^*$ |
| --- | --- | --- |
| Red 1 | +44.17 | −44.08 |
| 2 | +53.88 | −9.96 |
| 3 | +50.16 | −3.05 |
| 4 | +50.07 | +33.84 |
| 5 | +43.62 | +38.26 |
| Yellow 6 | +43.00 | +59.35 |
| 7 | +33.53 | +68.01 |
| 8 | +25.20 | +83.42 |
| 9 | +12.40 | +86.26 |
| 10 | −0.99 | +102.98 |
| Green 11 | −34.22 | −58.31 |
| 12 | −39.26 | +31.76 |
| 13 | −41.66 | +12.11 |
| 14 | −52.02 | +4.10 |
| 15 | −43.14 | −21.15 |
| Blue 16 | −18.48 | −54.64 |
| 17 | −7.58 | −55.98 |
| 18 | −3.79 | −61.14 |
| 19 | +13.21 | −56.23 |
| 20 | +29.03 | −54.62 |

It will be observed that the selected hues are not exactly equally positioned with respect to color space within the color spectrum, because of the availability of suitable pigments. The present system contemplates an equal balance between the warm and cool colors, using colors which are extensively used in the arts and graphic arts industry, and are thus available as proofing and printing inks. Each of these colors has its complementary color, which is obtained by merely adding the number 10 to the warm color selected, or subtracting 10 from a cooler color. The tint values have similar visual appearance because the 100% colors are of relatively uniform density. Once selected, tint strength can be most conveniently varied in terms of available coordinated materials. For example, where color sheets are employed, they are usually available in decade values, and with advice to the artist, available tint strengths can be selected to facilitate reproduction.

To obtain four equal groups, it will be observed that the yellow group (numbers 6 to 10) includes the oranges starting with coral red and ending with a clean lemon hue. In the case of the third group (numbers 11 to 15) the hues range from lime green to a bluish teal green. In the fourth group (numbers 16 to 20), the blues start with the process blue of the graphic arts industry, which artists identify as cerulean. This group ends with purple. Similarly, the first group (numbers 1 through 5) starts with a clear red violet, and ends with a bright scarlet red, commonly referred to as poster red.

The system also has application in the teaching of colors to those whose skills are substantially less than that of the artist, typically elementary school children and the like.

For example, where a simple two-color design is to be prepared for a poster, a first color to be chosen might be a bright carmine number 4, and to get maximum contrast, by adding ten numbers, a clear emerald green, number 14, may be quickly and easily selected. These colors are natural complements, and trigger an effect known as simultaneous contrast.

As a second example, a multi-color diagram may be prepared for a slide presentation. In such uses, there is normally no color restriction, and one might be tempted to use a wide variety of different colors that are available. Very often, this luxury results in a chaotic effect, defeating the purpose of the graphic diagram which is to clearly convey some important information. In such cases, an effective presentation may be obtained by choosing two sets of colors and their complements, for example, number 4 and 14, as above, in conjunction with number 9 and 19, to make a balanced four color selection, with one hue from each of the four color groups, and substantially equal distance from each other, i.e. five spaces apart.

As a third example, the second example may be amplified by the use of a variety of tints from these hues, and simplicity can be maintained by utilizing one hundred percent values in conjunction with the popular fifty percent middle tone values. This use can be designated by simple two digit notation following the notation of the basic hue.

It may thus be seen that I have invented a useful color system, which is relatively uncomplicated compared to prior art systems, but which yet permits substantially full utilization of the color spectrum. Since the system employs only twenty basic colors, ten of which are the complementary colors of the other ten, the concept of color can be readily appreciated not only by the experienced artist who must communicate his selected colors to a commercial reproducer, but also by younger students who need not be troubled with the nuances of complex color theory. The system is much easier to use than the known triad system employing only primary colors which are difficult to blend properly and do not afford sufficient guidance to the inexperienced. Intentionally, the hues are purposely chosen to cover the full spectrum, using only clear bright pigments with no black or other hues to muddy the visual appearance of the original base colors, with a consequently broader range of color combinations.

I wish it to be understood that I do not consider the invention to be limited to the precise details shown and described in the specification, for obvious modifications will occur to those skilled in the art to which the invention pertains.

I claim:

1. An improved color system for identifying hues of specific colors to facilitate the reproduction thereof, said system consisting of four color groups, each group including five hues; a first group of hues comprising the reds and ranging in wave length from 700 to 610 nanometers; a second group of hues comprising the yellows and ranging in wave length between 610 and 570 nanometers; a third group of hues comprising the greens and ranging from 570 to 590 nanometers; and a fourth group of hues comprising the blues ranging from 490 to 400 nanometers.

2. A system in accordance with claim 1 in which each of the twenty hues is identified by the following CIE-Lab notation:

| HUE | $a^*$ | $b^*$ |
| --- | --- | --- |
| Red 1 | +44.17 | −44.08 |
| 2 | +53.88 | −9.96 |
| 3 | +50.16 | −3.05 |
| 4 | +50.07 | −33.84 |
| 5 | +43.62 | +38.26 |
| Yellow 6 | +43.00 | +59.35 |
| 7 | +33.53 | +68.01 |
| 8 | +25.20 | +83.42 |
| 9 | +12.40 | +86.26 |
| 10 | −0.99 | +102.98 |
| Green 11 | −34.22 | −58.31 |
| 12 | −39.26 | +31.76 |
| 13 | −41.66 | +12.11 |
| 14 | −52.02 | +4.10 |
| 15 | −43.14 | −21.15 |
| Blue 16 | −18.48 | −54.64 |
| 17 | −7.58 | −55.98 |
| 18 | −3.79 | −61.14 |
| 19 | =13.21 | −56.23 |
| 20 | +29.03 | −54.62 |

* * * * *